(12) United States Patent
Arazaki

(10) Patent No.: US 11,281,948 B2
(45) Date of Patent: Mar. 22, 2022

(54) PRINTING CONTROL APPARATUS, PRINTING METHOD, AND PRINTING CONTROL PROGRAM

(71) Applicant: SEIKO EPSON CORPORATION, Tokyo (JP)

(72) Inventor: Shinichi Arazaki, Suwa-gun Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/160,031

(22) Filed: Jan. 27, 2021

(65) Prior Publication Data

US 2021/0241057 A1 Aug. 5, 2021

(30) Foreign Application Priority Data

Jan. 31, 2020 (JP) .............................. JP2020-014533

(51) Int. Cl.
*G06K 15/02* (2006.01)

(52) U.S. Cl.
CPC ..... *G06K 15/1896* (2013.01); *G06K 15/1886* (2013.01)

(58) Field of Classification Search
CPC .................. G06K 15/1896; G06K 15/1886
See application file for complete search history.

(56) References Cited

U.S. PATENT DOCUMENTS

| 6,574,007 | B1 * | 6/2003 | Imamura | G06T 1/60 358/1.16 |
| 9,723,231 | B2 * | 8/2017 | Tanaka | H04N 5/335 |
| 9,846,827 | B2 * | 12/2017 | Liu | G06F 3/128 |
| 2005/0024483 | A1 * | 2/2005 | Ikeda | H04N 1/40 347/249 |
| 2012/0050812 | A1 * | 3/2012 | Takahashi | G06K 15/102 358/1.16 |
| 2012/0069402 | A1 * | 3/2012 | Konno | G06K 15/1896 358/1.16 |
| 2013/0070262 | A1 * | 3/2013 | Konno | G06F 3/1212 358/1.6 |
| 2015/0235624 | A1 * | 8/2015 | Asai | G06T 1/60 345/209 |
| 2019/0034769 | A1 * | 1/2019 | Arazaki | G06K 15/1817 |

FOREIGN PATENT DOCUMENTS

| JP | 2018-158462 | 10/2018 |
| JP | 2018158462 A | * 10/2018 |

* cited by examiner

*Primary Examiner* — Ted W Barnes
(74) *Attorney, Agent, or Firm* — Workman Nydegger

(57) ABSTRACT

A printing control apparatus includes a control unit. Provided that n is an integer equal to or greater than one, the control unit configured to perform printing control processing including a plurality of types of processing configured to be performed simultaneously is configured to, in the printing control processing performed for an n-th time, write, to a first storage medium of the storage unit, n-th print data that is the print data generated in the printing control processing performed for an n-th time, and, in the printing control processing performed for an n+1-th time, write, to a second storage medium of the storage unit, n+1-th print data that is the print data generated in the printing control processing performed for an n+1-th time, and also read the n-th print data from the first storage medium and supply the n-th print data to the printing unit.

9 Claims, 13 Drawing Sheets

PRINTING CONTROL APPARATUS, PRINTING METHOD, AND PRINTING CONTROL PROGRAM

The present application is based on, and claims priority from JP Application Serial Number 2020-014533, filed Jan. 31, 2020, the disclosure of which is hereby incorporated by reference herein in its entirety.

BACKGROUND

1. Technical Field

The present disclosure relates to a printing control apparatus, a printing method, and a printing control program.

2. Related Art

Print data generated by image processing is written to a storage unit, and the print data read from the storage unit is supplied to a printing unit that performs printing onto a printing medium.

With regard to such a configuration, a printing system including a raster image processor (RIP) device, a plurality of solid state drives (SSDs), and a printer is disclosed (see JP-A-2018-158462). The RIP device inquires the printer about an empty storage device among the plurality of SSDs in generating new print data when the plurality of SSDs divide and store one piece of print data. The printer manages a storage region of each of the plurality of SSDs and, when there is an empty storage device, notifies the RIP device of the empty storage device. The RIP device is coupled to the notified empty storage device, and causes the coupled empty storage device to store new print data.

According to JP-A-2018-158462, by confirming an empty storage device in which the printer does not store data in a storage region, and notifying the RIP device of the empty storage device, new print data is stored in the empty storage device. However, in order to achieve efficient printing, an improvement is required to perform writing of print data to a storage unit and reading from the storage unit while reducing an overall processing load.

SUMMARY

A printing control apparatus includes a storage unit including a first storage medium and a second storage medium, and a control unit configured to generate, from an image, print data to be used in printing and write the print data to the storage unit, and read the print data from the storage unit and cause a printing unit to perform printing onto a printing medium, based on the print data, where, provided that n is an integer equal to or greater than one, the control unit configured to perform printing control processing including a plurality of types of processing configured to be performed simultaneously is configured to, in the printing control processing performed for an n-th time, write, to the first storage medium, n-th print data that is the print data generated in the printing control processing performed for an n-th time, and, in the printing control processing performed for an n+1-th time, write, to the second storage medium, n+1-th print data that is the print data generated in the printing control processing performed for an n+1-th time, and also read the n-th print data from the first storage medium and supply the n-th print data to the printing unit.

A printing method for generating, from an image, print data to be used in printing and writing the print data to a storage unit, and reading the print data from the storage unit and causing a printing unit to perform printing onto a printing medium, based on the print data, the printing method including, provided that n is an integer equal to or greater than one when repeating a printing control step including a plurality of types of processing configured to be performed simultaneously, in the printing control step performed for an n-th time, writing, to the first storage medium included in the storage unit, n-th print data that is the print data generated in the printing control step performed for an n-th time, and, in the printing control step performed for an n+1-th time, writing, to the second storage medium included in the storage unit, n+1-th print data that is the print data generated in the printing control step performed for an n+1-th time, and also reading the n-th print data from the first storage medium and supplying the n-th print data to the printing unit.

A non-transitory computer-readable storage medium storing a printing control program for causing a computer to achieve functions of generating, from an image, print data to be used in printing and writing the print data to a storage unit, and reading the print data from the storage unit and causing a printing unit to perform printing onto a printing medium, based on the print data, the printing control program including, provided that n is an integer equal to or greater than one when repeating printing control processing including a plurality of types of processing configured to be performed simultaneously, in the printing control processing performed for an n-th time, writing, to the first storage medium included in the storage unit, n-th print data that is the print data generated in the printing control processing performed for an n-th time, and, in the printing control processing performed for an n+1-th time, writing, to the second storage medium included in the storage unit, n+1-th print data that is the print data generated in the printing control processing performed for an n+1-th time, and also reading the n-th print data from the first storage medium and supplying the n-th print data to the printing unit.

DESCRIPTION OF EXEMPLARY EMBODIMENTS

Exemplary embodiments of the present disclosure will be described below with reference to each of the drawings. Note that each of the drawings is merely illustrative for describing the present exemplary embodiment. Since each of the drawings is illustrative, proportions and shapes may not be accurate, may not match each other, or a part may be omitted.

1. APPARATUS CONFIGURATION

Figure 1:
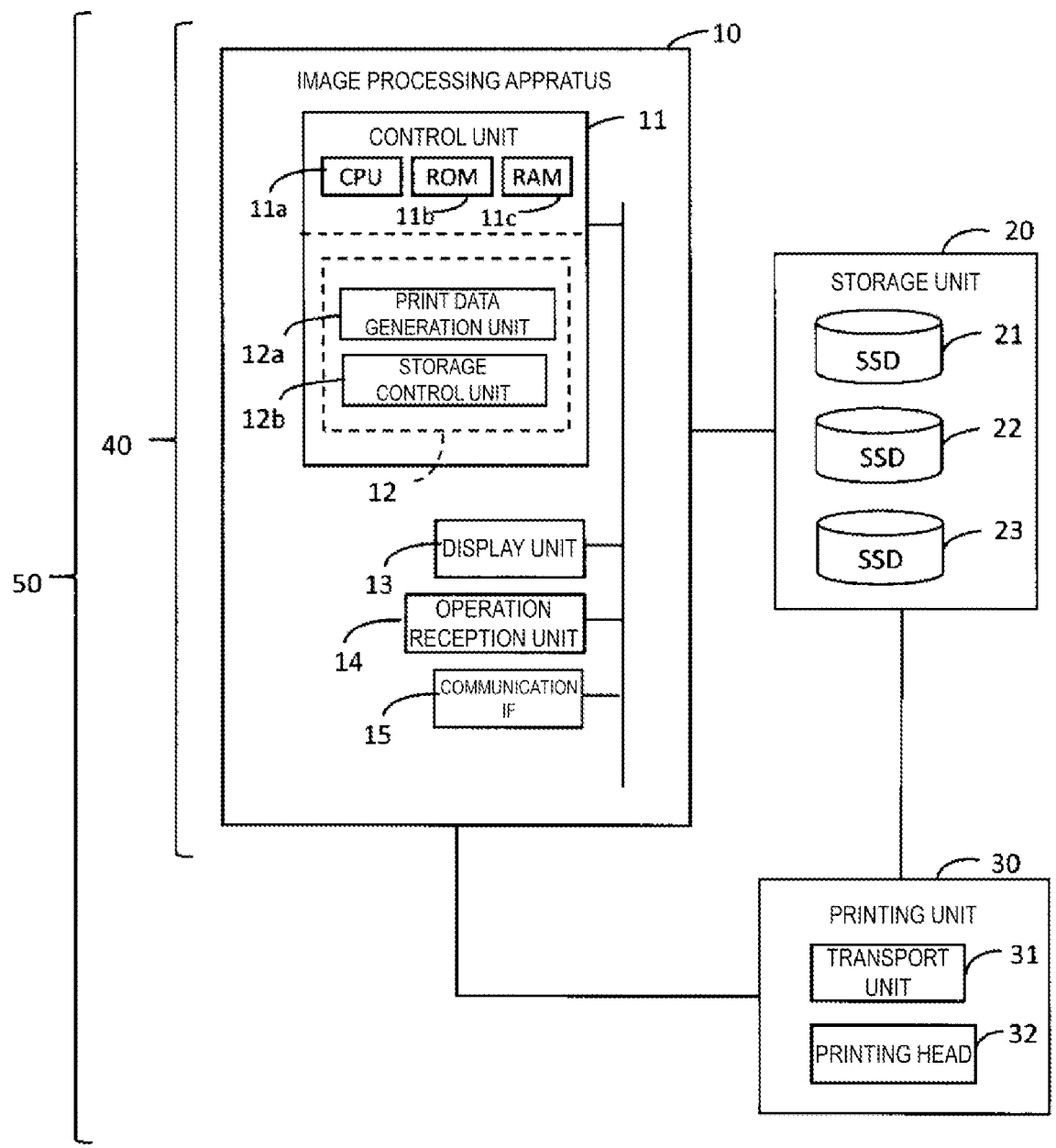
FIG. 1 is a block diagram simply illustrating a configuration related to the present exemplary embodiment.

FIG. 1 simply illustrates a configuration of a printing system 50 according to the present exemplary embodiment.

The printing system 50 includes an image processing apparatus 10, a storage unit 20, and a printing unit 30. The image processing apparatus 10 includes a control unit 11, a display unit 13, an operation reception unit 14, a communication IF 15, and the like. IF is an abbreviation for interface. The control unit 11 is configured to include one or a plurality of ICs including, as a processor, a CPU 11a, a ROM 11b, a RAM 11c, and the like, the other non-volatile memory, and the like.

In the control unit 11, the processor, i.e., the CPU 11a performs various types of control by performing arithmetic processing according to one or more programs 12 stored in the ROM 11b, the other memory, and the like by using the RAM 11c and the like as a work area. The control unit 11 functions as a print data generation unit 12a, a storage control unit 12b, and the like by following the program 12. The program 12 corresponds to a printing control program. Note that the processor may be configured to perform processing by a plurality of CPUs, instead of being limited to a single CPU, and a hardware circuit such as an ASIC, and may be configured to perform processing in cooperation between a CPU and a hardware circuit.

The display unit 13 is a means for displaying visual information, and is formed of, for example, a liquid crystal display, an organic EL display, and the like. The display unit 13 may be configured to include a display and a driving circuit for driving the display. The operation reception unit 14 is a means for receiving an operation by a user, and is realized by, for example, a physical button, a touch panel, a mouse, a keyboard, and the like. Of course, the touch panel may be realized as one function of the display unit 13.

The display unit 13 and the operation reception unit 14 may be a part of the configuration of the image processing apparatus 10, but may be a peripheral device external to the image processing apparatus 10. The communication IF 15 is a generic term for one or a plurality of IFs for the image processing apparatus 10 to be coupled to the outside in a wired or wireless manner in conformity with a predetermined communication protocol including a known communication standard.

The storage unit 20 includes a plurality of storage media. FIG. 1 illustrates an SSD 21, an SSD 22, and an SSD 23 as an example of the plurality of storage media. The SSD is formed of a flash memory, and reading and writing of data are faster than those of a hard disk drive (HDD). The plurality of storage media included in the storage unit 20 may be more than three storage media illustrated in FIG. 1. One of the plurality of storage media included in the storage unit 20 is referred to as a first storage medium, and another one of the plurality of storage media is referred to as a second storage medium. Further, one of the plurality of storage media included in the storage unit 20, which is neither the first storage medium nor the second storage medium, is referred to as a third storage medium. The RAM 11c may be understood as a part of the storage unit 20.

The printing unit 30 includes a transport unit 31 and a printing head 32. The transport unit 31 is a mechanism for transporting a printing medium in a predetermined transport direction. The printing medium is typically a sheet, but may be a medium made from a material other than a sheet. As known, the transport unit 31 includes a roller and a belt for transporting a printing medium, a motor for rotating the roller and the belt, and the like.

The printing head 32 is located midway along a transport path of a printing medium, and performs printing onto the printing medium transported by the transport unit 31. The printing head 32 performs printing by discharging ink of a plurality of colors such as cyan (C), magenta (M), yellow (Y), and black (K), for example, onto the printing medium by an ink-jet method. According to the ink-jet method, the printing head 32 discharges a dot of ink from a nozzle (not illustrated), based on print data that defines dot-on or dot-off for each pixel.

Figure 2:
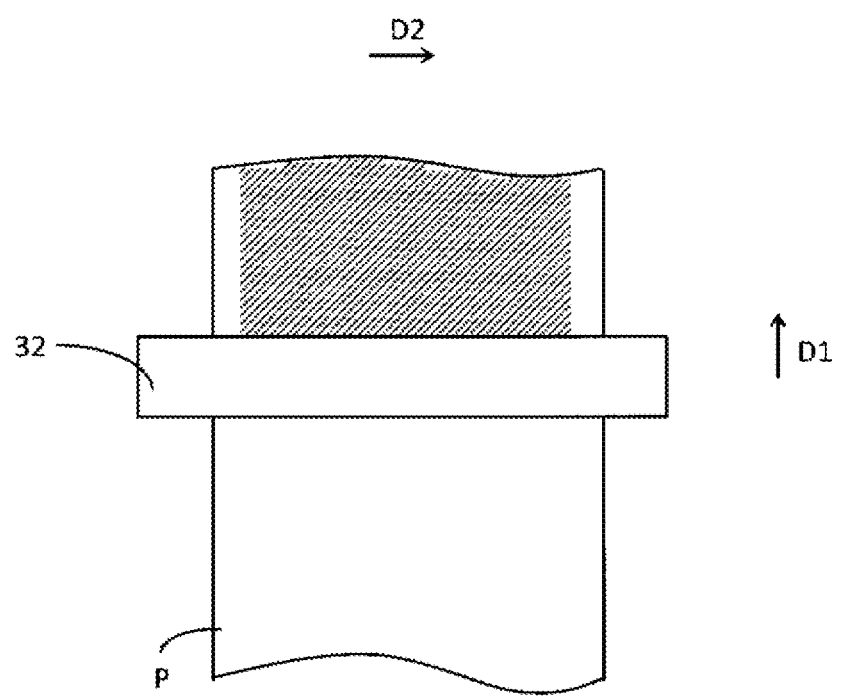
FIG. 2 is a diagram illustrating a relationship between a printing medium and a printing head when viewed from above.

FIG. 2 illustrates a relationship between a printing medium P to be transported and the printing head 32 when viewed downward from above. In FIG. 2, a transport direction of the printing medium P is indicated by a reference sign D1. As illustrated in FIG. 2, the long printing head 32 is disposed above the printing medium P in a direction D2 that intersects the transport direction D1. Although "intersect" is referred to as "orthogonal" here, it may be understood that "orthogonal" includes not only "orthogonal" in a strict sense but also includes an error that occurs in manufacturing of a product. The printing head 32 is a line type printing head including, for each color of ink, a nozzle row in which a plurality of nozzles are arranged over a range covering a width of the printing medium P along the direction D2.

Therefore, the printing medium P to be transported receives discharge of ink when passing under the printing head 32. In FIG. 2, hatching applied in the printing medium P indicates some sort of printing result recorded on the printing medium P. In the present exemplary embodiment, the transport unit 31 transports the continuous printing medium P, such as so-called roll paper, in the transport direction D1. According to such a printing unit 30, it can be said that a transport speed of the printing medium P by the transport unit 31 corresponds to a printing speed of the printing unit 30. The printing speed is a printing distance per unit time. The printing distance is a distance in the transport direction D1. The unit time is, for example, seconds or minutes.

A configuration including the image processing apparatus 10 and the storage unit 20 may be referred to as a printing control apparatus 40. The image processing apparatus 10 and the storage unit 20 may be apparatuses that are independent of each other, or may be a single apparatus in which the image processing apparatus 10 and the storage unit 20 are integrally formed. Alternatively, the printing control apparatus 40 may be a system formed of a plurality of apparatuses more than two being communicatively coupled to each other.

When the printing unit 30 is an apparatus independent of the image processing apparatus 10 and the storage unit 20, the printing unit 30 may be referred to as a printing apparatus, a recording device, an image formation device, a printer, and the like. Alternatively, the entire printing system 50 may be realized by a single apparatus 50. In other words, it may be understood that the image processing apparatus 10, the storage unit 20, and the printing unit 30 are included in a single printing apparatus.

2. PRINTING METHOD

Figure 3:
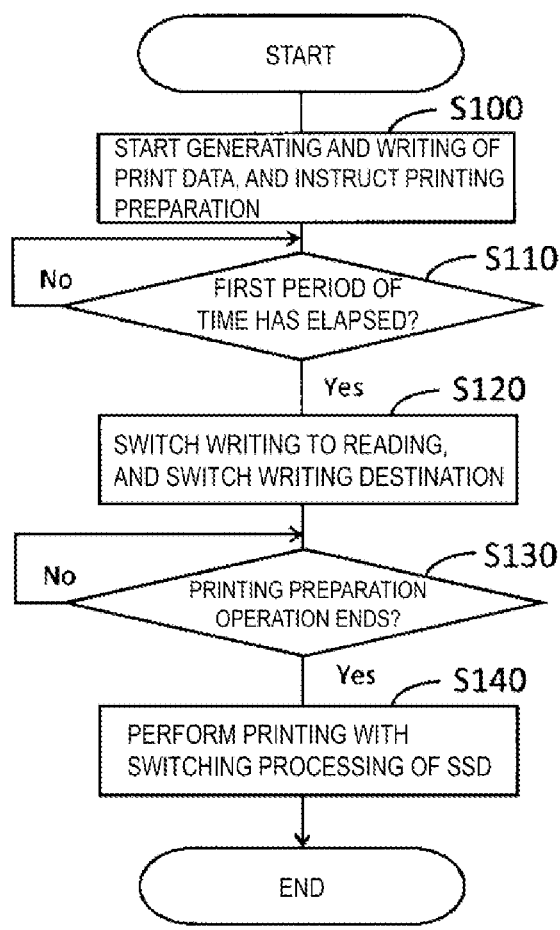
FIG. 3 is a flowchart illustrating a printing method according to the present exemplary embodiment.

FIG. 3 illustrates a printing method performed by the control unit 11 according to the program 12 by a flowchart.

The control unit 11 starts the flowchart in FIG. 3 in response to reception of a printing instruction of an image. The printing instruction is input by, for example, the user operating the operation reception unit 14. Alternatively, the control unit 11 inputs a command as a printing instruction from the outside via the communication IF 15.

In step S100, the print data generation unit 12a starts processing of generating, from an image, print data to be used in printing. The image herein is an image file designated as a print target by a printing instruction, and is a content over a plurality of pages. The print data generation unit 12a generates raster type print data that defines on or off of a dot for each color and each pixel used in printing by the printing head 32, by performing various types of image processing such as format conversion processing, pixel number conversion processing, color conversion processing, and halftone processing on each page constituting the image file. The generation processing of such print data is also referred to as RIP processing.

Further, in step S100, the storage control unit 12b starts processing of storing, in the storage unit 20, print data in a page unit generated by the print data generation unit 12a. Here, as an example, the storage control unit 12b sequentially writes the generated print data to the SSD 21.

The control unit 11 that receives the printing instruction further instructs the printing unit 30 to start a predetermined printing preparation operation. The printing preparation operation is an operation needed until the printing unit 30 is in a state capable of performing printing. The printing preparation operation includes, for example, flashing and cleaning of the nozzles for allowing the printing head 32 to be in a state capable of normally discharging ink from each of the nozzles. Further, the printing preparation operation includes, for example, activation processing until the transport unit 31 is in a state capable of transporting the printing medium P at a stable speed. The printing preparation operation takes some time. Depending on specifications and a type of the printing unit 30, as an example, approximately three minutes is required until the printing unit 30 ends the printing preparation operation after the printing unit 30 is instructed to start the printing preparation operation.

In step S110, the control unit 11 repeatedly determines whether a predetermined first period of time has elapsed since the generation of the print data has started in step S100, and the processing proceeds to step S120 from a determination of "Yes" when the first period of time has elapsed. The first period of time elapses earlier than the printing preparation operation ends. As described above, when the printing preparation operation takes approximately three minutes, the first period of time is, for example, approximately two minutes.

In step S120, the storage control unit 12b switches from writing to reading of the print data, and switches a writing destination of the print data. Specifically, the storage control unit 12b has been writing the generated print data to the SSD 21 since the generation of the print data has started in step S100, and thus supply processing of reading the print data from the SSD 21 and transferring the print data to the printing unit 30 starts. In other words, the SSD 21 is switched from the writing destination of the print data to a reading source of the print data. In addition, the storage control unit 12b changes the writing destination of the print data generated by the print data generation unit 12a from the previous SSD 21 to, for example, the SSD 22. The printing unit 30 to which the print data is supplied temporarily stores the print data in a buffer (not illustrated) included in the printing unit 30, and the temporarily stored print data can be used for printing.

In step S130, the control unit 11 repeatedly determines whether the printing preparation operation of the printing unit 30 has ended, and the processing proceeds to step S140 from a determination of "Yes" when the printing preparation operation has ended. The control unit 11 determines whether the printing preparation operation has ended by monitoring a state of the printing unit 30. Alternatively, the control unit 11 determines that the printing preparation operation has ended when the control unit 11 receives a notification of the end of the printing preparation operation from the printing unit 30.

In step S140, the control unit 11 instructs the printing unit 30 to start printing based on the print data, and causes the printing to be performed. Since step S100, the generation of the print data by the print data generation unit 12a has been continuing. Thus, in step S140, the generation of the print data and the printing by the printing unit 30 are performed simultaneously.

As described above, transferring of the print data to the printing unit 30 has started in step S120 at a timing at which the first period of time has elapsed earlier than the printing preparation operation ends. Therefore, at a point in time when "Yes" is determined in step S130, a certain amount of the print data is accumulated in the buffer of the printing unit 30, and the printing unit 30 can immediately start printing upon the start of step S140. In other words, in the present exemplary embodiment, in order to allow the printing unit 30 to immediately start printing upon the end of the printing preparation operation, step S120 is performed at a timing at which the first period of time has elapsed.

Further, the printing in step S140 proceeds with switching processing of an SSD by the recording control unit 12b. The switching processing of an SSD is processing of switching an SSD that has been previously a writing destination of print data to a reading source of the print data, and switching a writing destination of the print data to a different SSD. Therefore, step S120 is also one of the switching processing of an SSD. Such switching will be specifically described with reference to FIG. 4. When the printing unit 30 ends the printing based on the print data of a last page, the flowchart in FIG. 3 ends.

Figure 4:
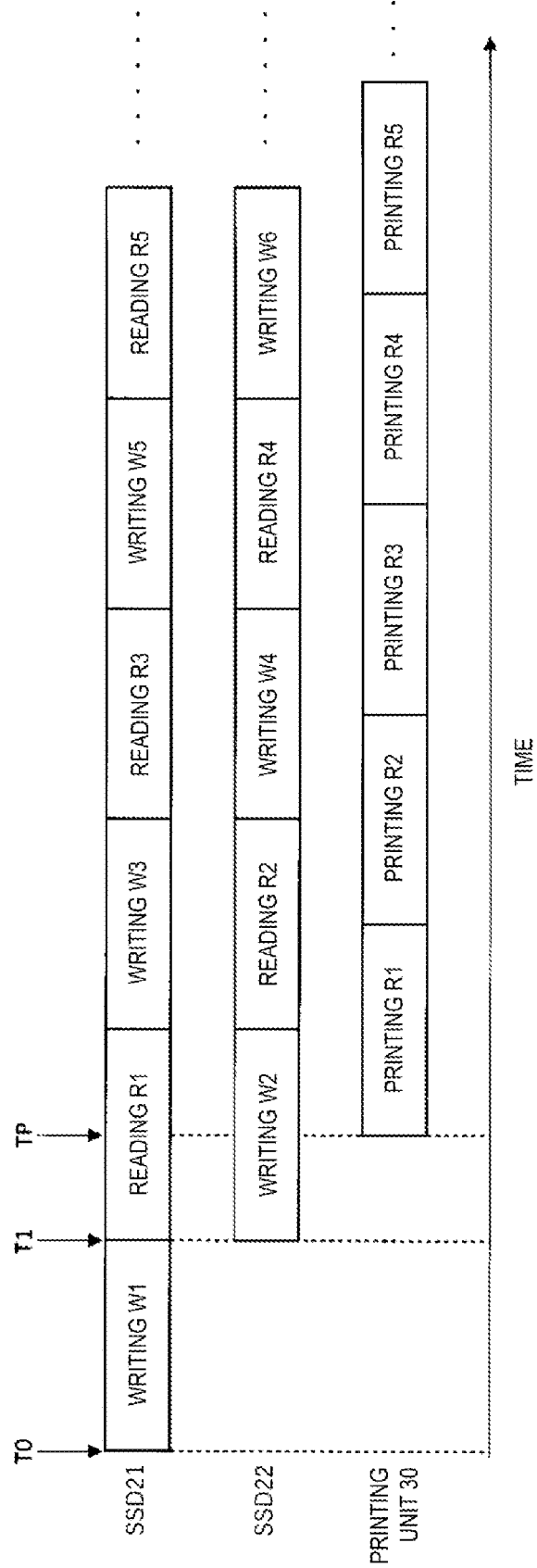
FIG. 4 is a diagram illustrating writing, reading, and printing of print data over time.

FIG. 4 is a diagram illustrating writing, reading, and printing by the printing unit 30 of print data over time. FIG. 4 illustrates each of a period of writing and reading of print data in relation to the SSD 21, a period of writing and reading of print data in relation to the SSD 22, and a printing period by the printing unit 30. In FIG. 4, the SSD 21 and the SSD 22 may be regarded as a first storage medium and a second storage medium. Either of the SSD 21 and the SSD 22 may be regarded as the first storage medium. In FIG. 4, the SSD 23 is not used. Therefore, there may be no SSD 23.

A time T0 is a timing at which step S100 starts, and a time T1 is a timing at which "Yes" is determined in step S110, i.e., a timing at which the first period of time has elapsed. From the time T0 to the time T1, i.e., a period indicated by "writing W1", the print data generation unit 12a generates print data, and the storage control unit 12b writes the generated print data to the SSD 21. At the time T1, reading of the print data from the SSD 21 starts in step S120, and a writing destination of the print data generated by the print data generation unit 12a is changed from the SSD 21 to the SSD 22.

A time TP is a timing at which the printing preparation operation ends. Therefore, step S140 starts at the time TP, and printing by the printing unit 30 starts. Here, in FIG. 4, a number such as, for example, "1" indicated with description of "reading R" refers to a period in which print data written to an SSD in a period of "writing W" indicated with the same number is read. For example, the storage control unit 12b reads, from the SSD 21 in a period of reading R1 following the period of writing W1, print data written to the SSD 21 in the period of writing W1, and transfers the print data to the printing unit 30. Similarly, the storage control unit 12b reads, from the SSD 22 in a period of reading R2 following a period of writing W2, printing data written to the SSD 22 in the period of writing W2, and transfers the print data to the printing unit 30.

Further, a reference sign such as, for example, "R1" indicated with description "printing" in FIG. 4 refers to a period of printing based on print data read from an SSD in a period of "reading" indicated with the same reference sign. In other words, the printing unit 30 performs, in a period of printing R1 from the time TP, ink discharge by the printing head 32 based on the print data read from the SSD 21 in the period of reading R1. Subsequently, the printing unit 30 performs, in a period of printing R2, ink discharge by the printing head 32 based on the print data read from the SSD 22 in the period of reading R2. During the printing period, of course, the printing unit 30 transports the printing medium P at a transport speed corresponding to the printing speed described above by the transport unit 31.

The switching processing of an SSD in step S140 will be described. The recording control unit 12b switches an SSD at a timing at which all pieces of print data stored in an SSD serving as a reading source of the print data are read from the SSD. For example, when the storage control unit 12b reads, from the SSD 21 after the time T1, print data written to the SSD 21 in the period of writing W1, the storage control unit 12b sets the SSD 22 that has been previously a writing destination of the print data to a reading source of the print data, and sets the SSD 21 that has been previously a reading source of the print data to a writing destination of the print data at a timing at which all pieces of the print data written to the SSD 21 in the period of writing W1 are finished to be read. In this way, the periods of reading R1 and writing W2 end, and the period of reading R2 and a period of writing W3 start.

Similarly, when the storage control unit 12b reads all pieces of the print data that need to be read from the SSD 22 in the period of reading R2, the storage control unit 12b sets the SSD 21 that has been the writing destination of the print data in the same period to a reading source of the print data, and sets the SSD 22 that has been previously the reading source of the print data to a writing destination of the print data. In this way, the periods of reading R2 and writing W3 end, and periods of reading R3 and writing W4 then start. Hereinafter, similarly, periods of reading R4 and writing W5, periods of reading R5 and writing W6, and . . . occur.

On the other hand, the printing unit 30 performs, in each of periods of printing R3, printing R4, printing R5, and . . . following the period of printing R2, printing based on the print data read in each of the periods of corresponding reading R3, reading R4, reading R5, and . . . . More specifically, after a predetermined amount of data of print data read in a corresponding reading period from a corresponding SSD is written to the buffer included in the printing unit 30, corresponding printing is started. Further, in each reading period, reading from an SSD is not always performed, and reading from the SSD and a stop of the reading from the SSD are repeated according to an availability state of the buffer included in the printing unit 30. These also apply to each of the drawings described later.

By such switching processing of an SSD, reading of the print data from the SSD 21 and reading of the print data from the SSD 22 alternately continue without an interval until reading of the print data of a last page ends. Further, a relationship in which, when one of the SSD 21 and the SSD 22 is a reading source of the print data, the other is a writing destination of the print data is repeated while replacing the role of the SSD 21 and the role of the SSD 22. Each period such as writing W1, writing W2, writing W3, writing W4, and . . . is also a period in which the print data generation unit 12a continuously generates the print data. Further, as clear from FIG. 4, such a writing period and the printing period by the printing unit 30 overlap each other after the time TP. Therefore, according to FIG. 4, a printing method for at least partially simultaneously performing generation of the print data and printing by the printing unit 30 is expressed.

In this way, the printing control apparatus 40 includes the storage unit 20 including the first storage medium and the second storage medium, and the control unit 11 configured to generate, from an image, print data to be used in printing and write the print data to the storage unit 20, and read the print data from the storage unit 20 and cause the printing unit 30 to perform printing onto the printing medium P, based on the print data. In the present exemplary embodiment, a period in which print data is read from a certain storage medium and supplied to the printing unit 30 is basically considered as a period of single printing control processing. According to FIG. 4, generation of print data and writing of the print data to an SSD are performed simultaneously with reading of print data from a different SSD after the time TP. Thus, it can be said that the control unit 11 performs the printing control processing including a plurality of types of processing configured to be performed simultaneously, such as writing and reading of print data. Then, provided that n is an integer equal to or greater than one, according to FIG. 4, in the printing control processing performed for an n-th time, the control unit 11 writes, to the first storage medium, n-th print data that is the print data generated in the printing control processing performed for an n-th time. Then, in the printing control processing performed for an n+1-th time, the control unit 11 writes, to the second storage medium, n+1-th print data that is the print data generated in the printing control processing performed for an n+1-th time, and also reads the n-th print data from the first storage medium and supplies the n-th print data to the printing unit 30.

For example, when the periods of reading R2 and writing W3 are considered as the printing control processing performed for an n-th time, the following periods of reading R3 and writing W4 can be considered as the printing control processing performed for an n+1-th time. In this case, the periods of reading R4 and writing W5 correspond to the printing control processing performed for an n+2-th time. In the printing control processing performed for an n+2-th time, the control unit 11 writes, to the first storage medium, n+2-th print data that is the print data generated in the printing control processing performed for an n+2-th time, and also reads the n+1-th print data from the second storage medium and supplies the n+1-th print data to the printing unit 30.

In this way, the control unit 11 simultaneously performs writing of print data using one storage medium and reading of print data, from a different storage medium, written to the different storage medium in the printing control processing the last time. Thus, efficient printing, i.e., simultaneous execution of generation of print data and printing by the printing unit 30 based on the print data can be smoothly performed.

Several modified examples included in the present exemplary embodiment will be described below.

3. FIRST MODIFIED EXAMPLE

Figure 5:
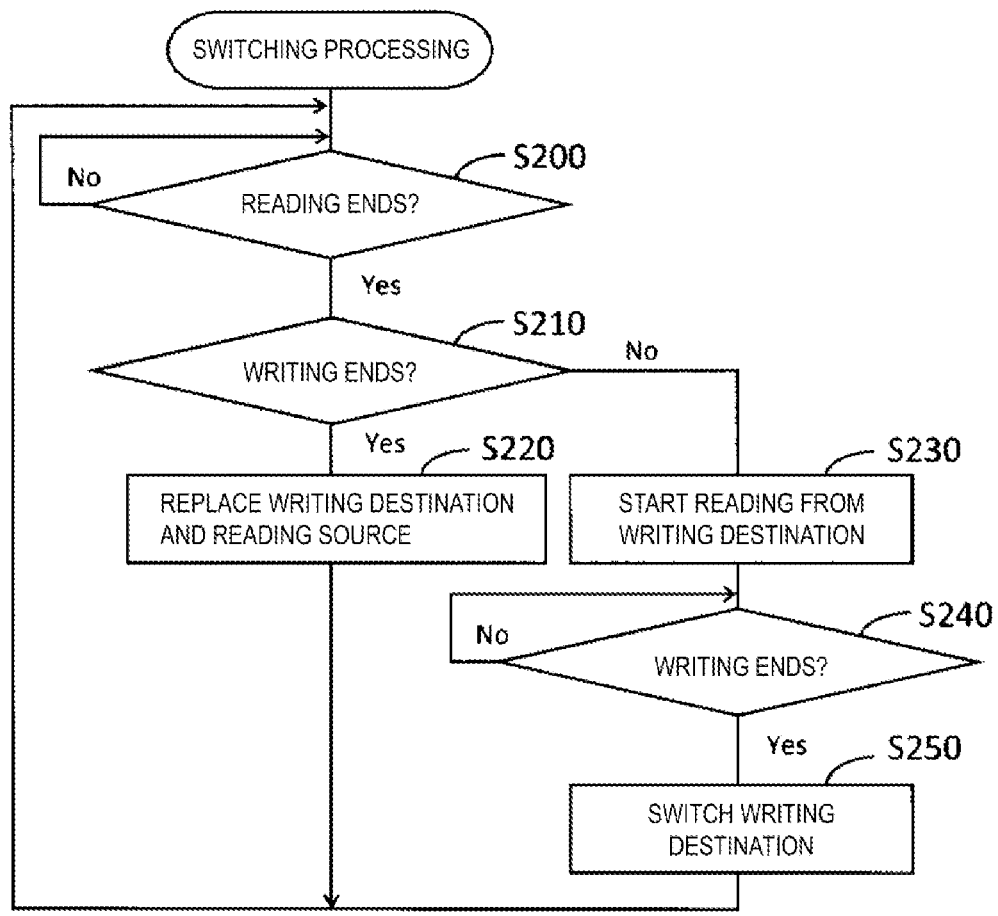
FIG. 5 is a flowchart illustrating switching processing of an SSD according to a first modified example.

FIG. 5 is a flowchart illustrating switching processing of an SSD according to a first modified example.

Figure 6:
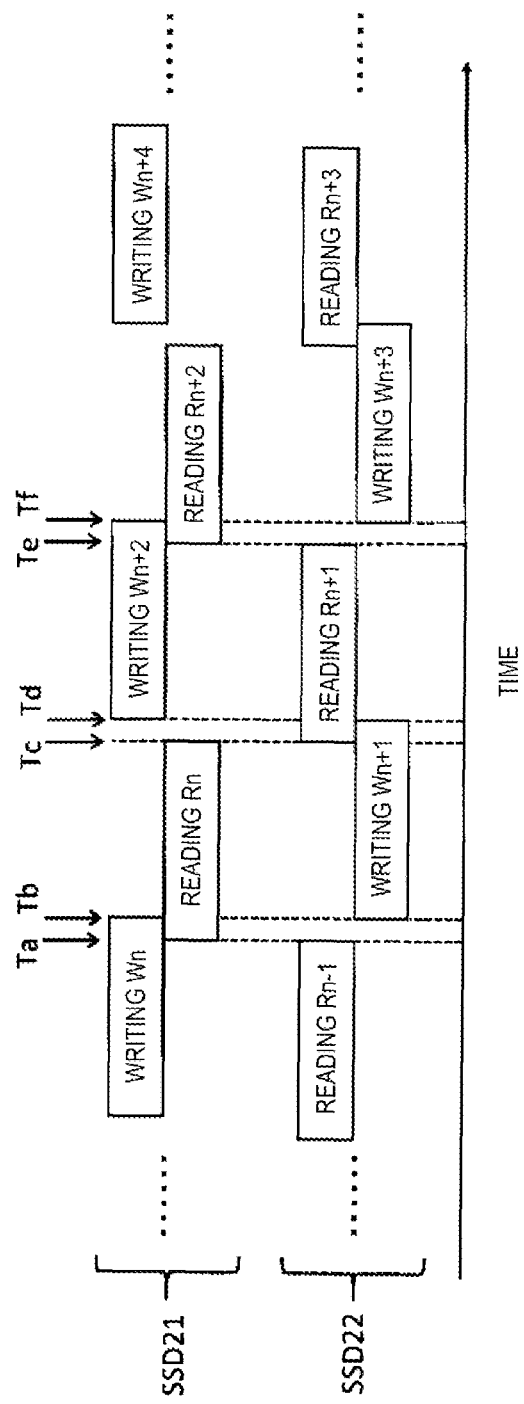
FIG. 6 is a diagram illustrating writing and reading of print data according to the first modified example over time.

FIG. 6 is a diagram illustrating the switching processing of an SSD according to the first modified example, and illustrates each of periods of writing and reading of print data in relation to the SSD 21 and periods of writing and reading of print data in relation to the SSD 22 over time.

In step S140, the storage control unit 12*b* repeatedly determines whether reading of print data written to an SSD serving as a current reading source of the print data has ended during printing control processing for a certain time (step S200). Then, when all of the reading of the print data written to the SSD serving as the reading source ends ("Yes" in step S200), the storage control unit 12*b* determines whether writing of the print data to an SSD serving as a current writing destination of the print data has ended (step S210).

The storage control unit 12*b* stores, in the SSD serving as the writing destination in a page unit, print data generated from each page of an image file by the print data generation unit 12*a*. In other words, the storage control unit 12*b* does not switch the writing destination of the print data in the middle of a page of print data being written. Therefore, at a timing at which halfway print data of one certain page is being written to the SSD serving as the writing destination at a point in time when the storage control unit 12*b* determines "Yes" in step S200, the storage control unit 12*b* does not determine a writing end, i.e., determines "No" in step S210, and the processing proceeds to step S230. On the other hand, at a timing at which writing of print data of one certain page has ended at a point in time when the storage control unit 12*b* determines "Yes" in step S200, the storage control unit 12*b* determines a writing end, i.e., "Yes" in step S210, and the processing proceeds to step S220.

In step S220, the storage control unit 12*b* replaces the writing destination and the reading source. In other words, the SSD that has been previously the writing destination of the print data is switched to a reading source of the print data, and the SSD that has been previously the reading source of the print data is set to a writing destination of the print data. In this way, the printing control processing for a next time starts. After step S220, the storage control unit 12*b* performs the determination in step S200 again. When the cycle of steps S200, S210, and S220 is repeated, the printing control processing in which a period of reading of print data from one SSD and a period of writing of print data to a different SSD coincide with each other is repeated, as illustrated in FIG. 4.

The first modified example is an example assuming a case in which "No" is determined in step S210. In step S230, while continuing writing of print data to an SSD serving as a current writing destination, the storage control unit 12*b* starts reading of the print data from the SSD serving as the writing destination. In other words, reading of print data in the printing control processing for a next time starts first.

In step S240, similarly to step S210, the storage control unit 12*b* determines whether writing of the print data to the SSD serving as the current writing destination of the print data has ended. However, the storage control unit 12*b* repeatedly performs the determination in step S240. In step S240, when the storage control unit 12*b* determines that the writing of the print data to the SSD serving as the current writing destination of the print data has ended, the processing proceeds from "Yes" to step S250.

In step S250, the storage control unit 12*b* switches the writing destination of the print data. In other words, the SSD that has been the reading source of the print data until "Yes" is determined in step S200 is set to a writing destination of the print data. In this way, the printing control processing for a next time starts in a complete manner. After step S250, the storage control unit 12*b* performs the determination in step S200 again.

Note that the flowchart illustrated in FIG. 5 is performed until generation processing and printing of the print data of a last page is completed. This also applies to flowcharts illustrated in FIGS. 7, 9, and 11 described later.

The flow of the processing in FIG. 5 will be specifically described with reference to FIG. 6. With regard to FIG. 6 and FIGS. 8, 10, and 12 described later, it is assumed that the SSD 21 is a first storage medium and the SSD 22 is a second storage medium. Further, in FIG. 6, a reference sign such as, for example, "n" indicated with description of "reading R" refers to a period in which print data written to an SSD in a period of "writing W" indicated with the same reference sign is read. Further, a reference sign such as, for example, "n" indicated with the description of "writing W" also indicates that "n" print data generated in printing control processing for a time represented by the reference sign is written to the SSD in the period of writing W represented by the reference sign.

It is assumed that the storage control unit 12*b* determines "Yes" in step S200 at a timing of a time Ta in periods of reading Rn−1 and writing Wn. In this case, writing of n-th print data to the SSD 21 has not ended at the timing of the time Ta, and thus the processing proceeds to step S230 through "No" in step S210, and the storage control unit 12*b* starts reading of the n-th print data from the SSD 21. In other words, the reading source of the print data is switched from the SSD 22 to the SSD 21 with the time Ta as a boundary.

The storage control unit 12*b* determines "Yes" at a timing of a time Tb during a repetition of the determination in step S240, i.e., the determination of whether the writing of the n-th print data to the SSD 21 has ended. Therefore, in a period from the time Ta to the time Tb, the storage control unit 12*b* simultaneously performs the writing of the n-th print data to the SSD 21 and the reading of the n-th print data that has already been written from the SSD 21. In step S250, the storage control unit 12*b* switches the writing destination of the print data from the SSD 21 to the SSD 22. In this way, writing of n+1-th print data to the SSD 22 starts from the time Tb.

In FIG. 6, a period until the time Tb is assumed to be the printing control processing performed for an n-th time corresponding to the periods of reading Rn−1 and writing Wn. Further, a period between the time Ta and a time Td is assumed to be the printing control processing performed for an n+1-th time corresponding to periods of reading Rn and writing Wn+1. Similarly, a period between a time Tc and a time Tf is assumed to be the printing control processing performed for an n+2-th time corresponding to periods of reading Rn+1 and writing Wn+2. When the storage control unit 12b determines "Yes" in step S200 at a timing of the time Tc in the periods of reading Rn and writing Wn+1, writing of the n+1-th print data to the SSD 22 has not ended at the timing of the time Tc, and thus the processing proceeds to step S230 through "No" in step S210, and the storage control unit 12b starts reading of the n+1-th print data from the SSD 22. In other words, the reading source of the print data is switched from the SSD 21 to the SSD 22 with the time Tc as a boundary.

The storage control unit 12b determines "Yes" at a timing of the time Td during a repetition of the determination in step S240, i.e., the determination of whether the writing of the n+1-th print data to the SSD 22 has ended. Therefore, in a period from the time Tc to the time Td, the writing of the n+1-th print data to the SSD 22 and the reading of the n+1-th print data that has already been written from the SSD 22 are simultaneously performed. In step S250, the storage control unit 12b switches the writing destination of the print data from the SSD 22 to the SSD 21. In this way, writing of n+2-th print data to the SSD 21 starts from the time Td. Hereinafter, similarly, the printing control processing performed for an n+3-th time corresponding to periods of reading Rn+2 and writing Wn+3 is performed such that a part of the period of reading Rn+2 in the printing control processing performed for an n+3-th time overlaps a part of the period of writing Wn+2 in the printing control processing performed for an n+2-th time. Similarly, the printing control processing performed for an n+4th time corresponding to periods of reading Rn+3 and writing Wn+4 is performed such that a part of the period of reading Rn+3 in the printing control processing performed for an n+4th time overlaps a part of the period of writing Wn+3 in the printing control processing performed for an n+3-th time.

In this way, in the first modified example, when reading and writing of print data do not simultaneously end in the printing control processing for a certain time, a period of the writing of the print data in the printing control processing for the time and a period of reading of the print data in the printing control processing for a next time partially overlap each other. In other words, when reading of the n-th print data ends in the middle of writing of the n+1-th print data to the second storage medium in the printing control processing performed for an n+1-th time, the control unit 11 starts reading of the n+1-th print data from the second storage medium in the printing control processing performed for an n+2-th time before writing of the n+1-th print data to the second storage medium ends, and the control unit 11 starts writing of the n+2-th print data to the first storage medium after writing of the n+1-th print data to the second storage medium ends. According to such a configuration, even when reading and writing of print data do not simultaneously end in the printing control processing for a certain time, the reading of the print data can be performed without interruption, and continuous printing by the printing unit 30 can be achieved.

4. SECOND MODIFIED EXAMPLE

Figure 7:
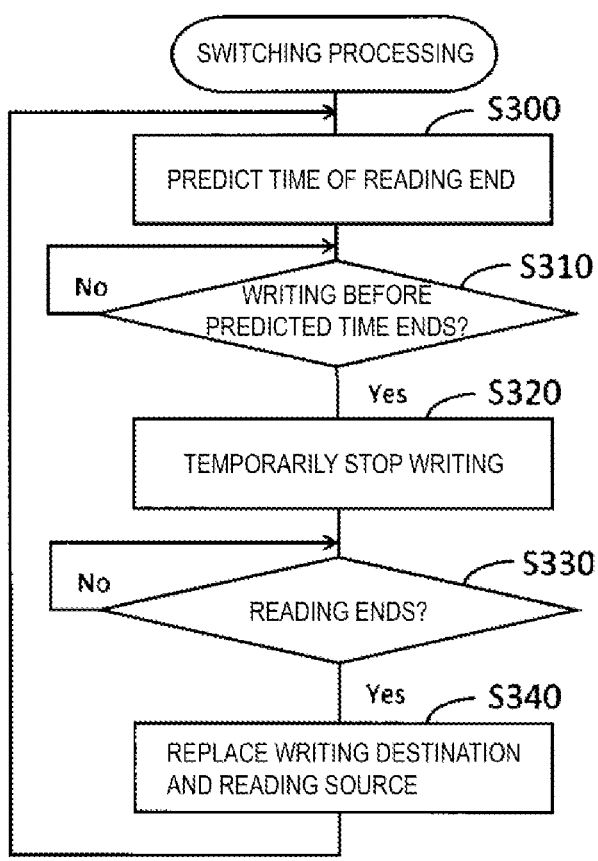
FIG. 7 is a flowchart illustrating switching processing of an SSD according to a second modified example.

FIG. 7 is a flowchart illustrating switching processing of an SSD according to a second modified example.

Figure 8:
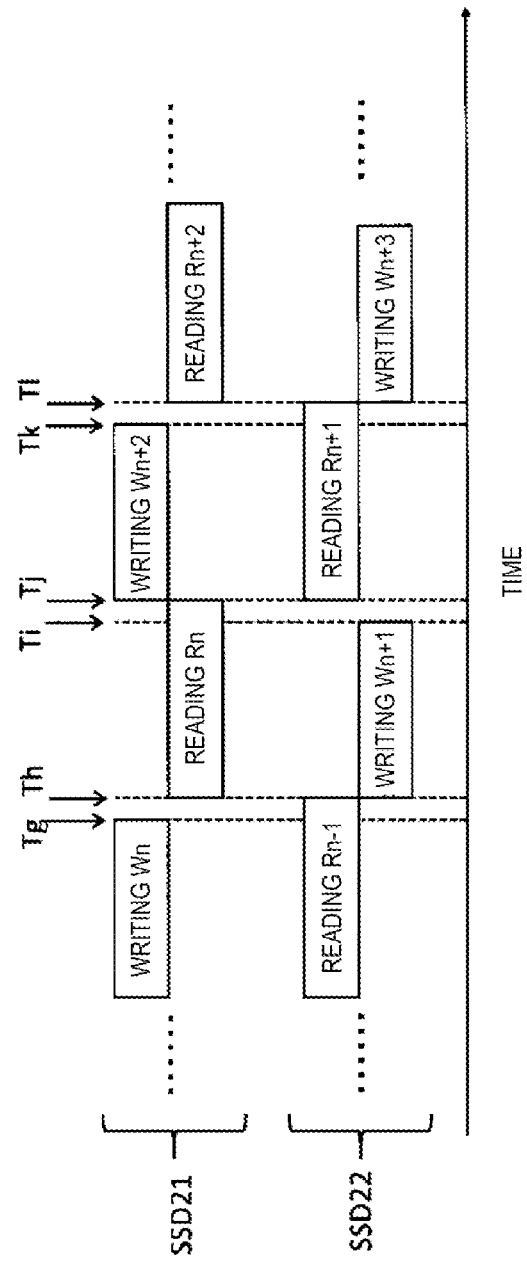
FIG. 8 is a diagram illustrating writing and reading of print data according to the second modified example over time.

FIG. 8 is a diagram illustrating the switching processing of an SSD according to the second modified example, and illustrates each of periods of writing and reading of print data in relation to the SSD 21 and periods of writing and reading of print data in relation to the SSD 22 over time. A way of looking at FIG. 8 is similar to that of FIG. 6.

In step S140, the storage control unit 12b predicts a time at which reading of print data from an SSD serving as a current reading source of the print data ends during the printing control processing for a certain time (step S300). The storage control unit 12b may predict a time at which reading of all pieces of the print data stored in the SSD serving as the reading source ends, based on, for example, the number of pages of the print data stored in the SSD serving as the reading source, time required for reading of print data for one page based on past performance of reading, and the like.

In step S310, the storage control unit 12b repeatedly determines whether a timing of a writing end of the print data is before the time of the end predicted in step S300. As described above, the storage control unit 12b stores, in an SSD serving as a writing destination in a page unit, the print data generated by the print data generation unit 12a. Further, the storage control unit 12b can calculate time required for generation and writing of the print data for one page based on past performance of writing. Thus, the storage control unit 12b may determine that "Yes" in step S310 and the processing may proceed to step S320 when writing of last print data in a page unit in which a timing of a writing end does not exceed the time of the end predicted in step S300 ends in a case in which writing of the print data in the page unit to the SSD serving as the current writing destination continues.

In step S320, the storage control unit 12b temporarily stops the writing of the print data to the SSD. At this time, the print data generation unit 12a also temporarily stops the generation of the print data.

In step S330, the storage control unit 12b repeatedly determines whether the reading of the print data written to the SSD serving as the current reading source has ended. Then, when all of the reading of the print data written to the SSD serving as the current reading source ends ("Yes" in step S330), the processing proceeds to step S340.

In step S340, the storage control unit 12b replaces the writing destination and the reading source. In other words, the SSD that has been previously the writing destination of the print data is switched to a reading source of the print data, and the SSD that has been previously the reading source of the print data is set to a writing destination of the print data. In this way, the printing control processing for a next time starts. After step S340, the storage control unit 12b performs step S300 again.

The flow of the processing in FIG. 7 will be specifically described with reference to FIG. 8.

In step S300, the storage control unit 12b predicts, as a time Th, a timing at which reading of n−1st print data from the SSD 22 ends in periods of reading Rn−1 and writing Wn. Then, the storage control unit 12b determines a writing end of n-th print data at a timing of a time Tg before the time Th that is the predicted timing, and the processing proceeds from "Yes" in step S310 to step S320. In step S320, the storage control unit 12b stops writing of the n-th print data to the SSD 21. Furthermore, the storage control unit 12b determines "Yes" in step S330 at the timing of the time Th, and the processing proceeds to step S340. The storage control unit 12b switches the reading source of the print data from the SSD 22 to the SSD 21, and switches the writing destination of the print data from the SSD 21 to the SSD 22. Therefore, the writing of the print data stops in the period from the time Tg to the time Th, and the SSD serving as the reading source of the print data and the SSD serving as the writing destination are replaced with the time Th as a boundary.

In FIG. 8, a period until the time Th is assumed to be the printing control processing performed for an n-th time corresponding to the periods of reading Rn−1 and writing Wn. Further, a period between the time Th and a time Tj is assumed to be the printing control processing performed for an n+1-th time corresponding to periods of reading Rn and writing Wn+1. Similarly, a period between the time Tj and a time Tl is assumed to be the printing control processing performed for an n+2-th time corresponding to periods of reading Rn+1 and writing Wn+2.

In step S300, the storage control unit 12b predicts, as the time Tj, a timing at which reading of the n-th print data from the SSD 22 ends in the periods of reading Rn and writing Wn+1, and determines a writing end of n+1-th print data at a timing of a time Ti before the time Tj, and the processing proceeds from "Yes" in step S310 to step S320. In step S320, the storage control unit 12b stops writing of the n+1-th print data to the SSD 22. Furthermore, the storage control unit 12b determines "Yes" in step S330 at the timing of the time Tj, and the processing proceeds to step S340. The storage control unit 12b switches the reading source of the print data from the SSD 21 to the SSD 22, and switches the writing destination of the print data from the SSD 22 to the SSD 21. Therefore, the writing of the print data stops in the period from the time Ti to the time Tj, and the SSD serving as the reading source of the print data and the SSD serving as the writing destination are replaced with the time Tj as a boundary. Hereinafter, similarly, in the printing control processing performed for an n+2-th time, writing of n+2-th print data ends at a timing of a time Tk before the time Tl predicted in step S300, and the SSD serving as the reading source of the print data and the SSD serving as the writing destination are replaced with the time Tl as a boundary. Similarly, in the printing control processing performed for an n+3-th time corresponding to periods of reading Rn+2 and writing Wn+3, writing of n+3-th print data to the SSD 22 ends at a timing of a time before a time predicted in step S300.

In this way, in the second modified example, the control unit 11 predicts a timing at which reading of the n-th print data ends in the printing control processing performed for an n+1-th time, and ends writing of the n+1-th print data to the second storage medium before a timing of the predicted end. In other words, in the printing control processing for each time, writing of print data to a storage medium serving as a writing destination is caused to end before a timing at which reading of print data from a storage medium serving as a reading source ends. According to such a configuration, when a role of a storage medium is switched from a writing destination to a reading source of print data, a blank period is generated, and it is possible to avoid partial overlapping between a period of writing of the print data to the storage medium and a period of reading of the print data. Therefore, a reduction in performance of the storage medium due to such overlapping can be avoided. Further, similarly to the previous exemplary embodiments and modified examples, also in the second modified example, reading of the print data can be performed without interruption, and continuous printing by the printing unit 30 can be achieved.

5. THIRD MODIFIED EXAMPLE

No particular reference has been made to erasing of print data written to an SSD. The storage control unit 12b may basically write print data to an available capacity in an SSD. In a third modified example, the storage control unit 12b actively erases old print data that has already been read when new print data is written to an SSD.

Figure 9:
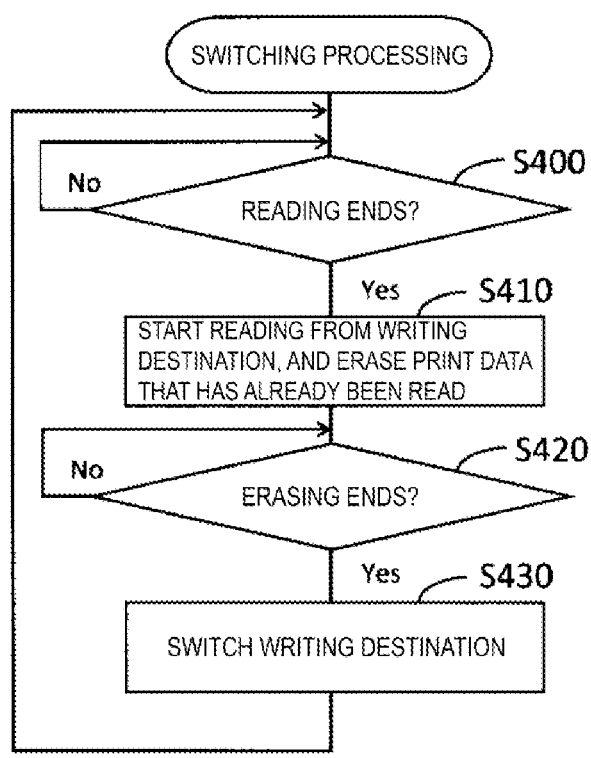
FIG. 9 is a flowchart illustrating switching processing of an SSD according to a third modified example.

FIG. 9 is a flowchart illustrating switching processing of an SSD according to the third modified example.

Figure 10:
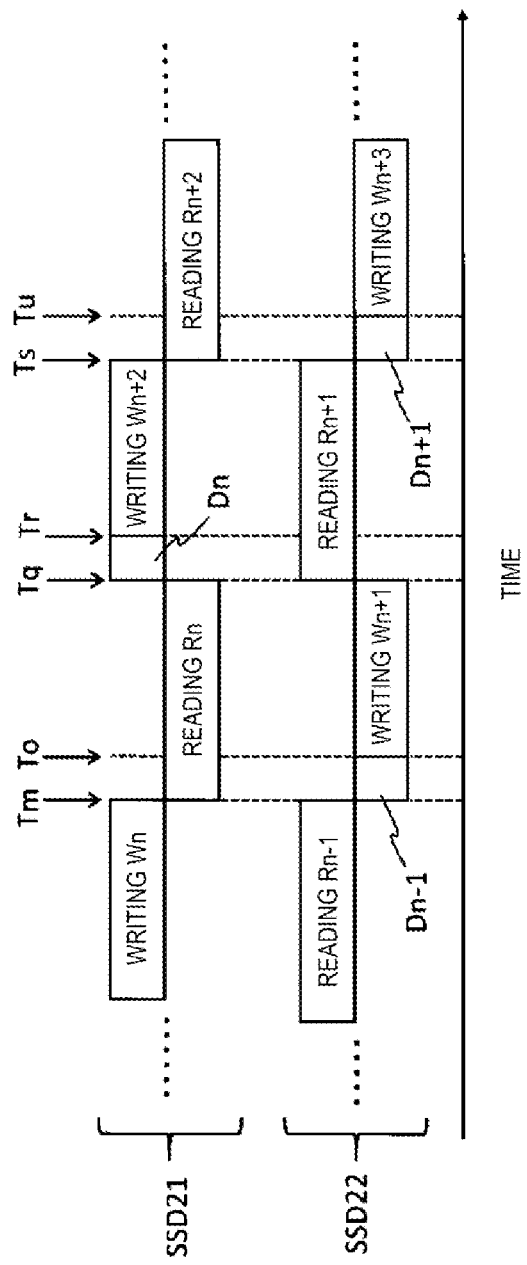
FIG. 10 is a diagram illustrating writing and reading of print data according to the third modified example over time.

FIG. 10 is a diagram illustrating the switching processing of an SSD according to the third modified example, and illustrates each of periods of writing and reading of print data in relation to the SSD 21 and periods of writing and reading of print data in relation to the SSD 22 over time. A way of looking at FIG. 10 is similar to that of FIGS. 6 and 8.

In step S140, the storage control unit 12b repeatedly determines whether reading of print data written to an SSD serving as a current reading source has ended during the printing control processing for a certain time (step S400). Then, when all of the reading of the print data written to the SSD serving as the current reading source ends ("Yes" in step S400), the processing proceeds to step S410.

In step S410, the storage control unit 12b starts reading of the print data from an SSD that has been previously a writing destination of the print data. In this way, reading of the print data in the printing control processing for a next time starts. In addition, in step S410, the storage control unit 12b starts erasing of the print data that is stored in the SSD that has been previously the reading source of the print data, and has been already read at a point in time when "Yes" is determined in step S400. The storage control unit 12b repeatedly determines whether the erasing of the print data that has started in step S410 has ended (step S420). When the erasing of the print data has ended, the processing proceeds to step S430.

In step S430, the storage control unit 12b switches the writing destination of the print data. In other words, the SSD that has been the reading source of the print data until "Yes" is determined in step S400 is set to a writing destination of the print data. The SSD serving as the writing destination after the switching in step S430 is, of course, the SSD being the target for the erasing of the print data that has been already read in step S410. In this way, writing of the print data in the printing control processing for a next time starts. After step S430, the storage control unit 12b performs the determination in step S400 again.

The flow of the processing in FIG. 9 will be specifically described with reference to FIG. 10.

The storage control unit 12b repeatedly determines whether reading of n−1st print data from the SSD 22 has ended in periods of reading Rn−1 and writing Wn (step S400), and determines "Yes" in step S400 at a timing of a time Tm, and the processing proceeds to step S410. In this way, in step S410, the storage control unit 12b switches the reading source of the print data from the SSD 22 to the SSD 21, and starts erasing of the n−1st print data that is stored in the SSD 22 and has been already read.

Note that, in FIG. 10, at the timing at which the reading source of the print data is switched from one SSD to a different SSD, i.e., the timing at which "Yes" is determined in step S400, writing of the print data to the different SSD has also ended. However, this is merely an example, and, as in the first modified example, the writing of the print data to the different SSD may continue for some time even after the reading source of the print data is switched to the different SSD. Alternatively, as in the second modified example, the writing of the print data to the different SSD may end earlier than the timing at which the reading source of the print data is switched to the different SSD.

The storage control unit 12b determines that the erasing of the n−1st print data that is stored in the SSD 22 and has already been read has ended at a timing of a time To, and the processing proceeds from "Yes" in step S420 to step S430. Then, in step S430, the writing destination of the print data is switched to the SSD 22. In other words, in FIG. 10, a period indicated by a reference sign Dn−1 from the time Tm to the time To is a period in which the n−1st print data is erased from the SSD 22.

In FIG. 10, a period until the time Tm is assumed to be the printing control processing performed for an n-th time corresponding to the periods of reading Rn−1 and writing Wn. Further, a period between the time Tm and a time Tq is assumed to be the printing control processing performed for an n+1-th time corresponding to periods of reading Rn and writing Wn+1. Similarly, a period between the time Tq and a time Ts is assumed to be the printing control processing performed for an n+2-th time corresponding to periods of reading Rn+1 and writing Wn+2.

The storage control unit 12b repeatedly determines whether reading of n-th print data from the SSD 21 has ended in the periods of reading Rn and writing Wn+1 (step S400), and determines "Yes" at a timing of the time Tq, and the processing proceeds to step S410. In this way, in step S410, the storage control unit 12b switches the reading source of the print data from the SSD 21 to the SSD 22, and starts erasing of the n-th print data that is stored in the SSD 21 and has been already read. The storage control unit 12b determines that the erasing of the n-th print data that is stored in the SSD 21 and has already been read ends at a timing of a time Tr, the processing proceeds from "Yes" in step S420 to step S430, and the storage control unit 12b switches the writing destination of the print data to the SSD 21 in step S430. In FIG. 10, a period indicated by a reference sign Dn from the time Tq to the time Tr is a period in which the n-th print data is erased from the SSD 21.

Hereinafter, similarly, the storage control unit 12b switches the reading source of the print data to the SSD 21 at a timing of the time Ts at which "Yes" is determined in step S400 in the printing control processing performed for an n+2-th time, and also starts erasing of n+1-th print data in the SSD 22. Then, at a timing of a time Tu at which the erasing has ended, writing of the print data to the SSD 22 starts. In other words, the printing control processing performed for an n+3-th time corresponding to periods of reading Rn+2 and writing Wn+3 is performed. In FIG. 10, a period indicated by a reference sign Dn+1 from the time Ts to the time Tu is a period in which the n+1-th print data is erased from the SSD 22.

In this way, in the third modified example, the control unit 11 erases print data that is stored in the second storage medium and has already been read, before the n+1-th print data is written to the second storage medium in the printing control processing performed for an n+1-th time. According to such a configuration, when reading of print data from a certain storage medium ends, a storage capacity of the storage medium can be reliably secured by erasing print data that is stored in the storage medium and becomes unnecessary before the print data is written to the storage medium. Further, similarly to the previous exemplary embodiments and modified examples, also in the third modified example, reading of the print data can be performed without interruption, and continuous printing by the printing unit 30 can be achieved.

6. FOURTH MODIFIED EXAMPLE

In the third modified example, print data that is stored in an SSD serving as a reading source and has been already read is erased before writing of print data to the SSD starts. The storage control unit 12b cannot write the print data during a period of the erasing. Thus, in a fourth modified example, writing and reading of print data are performed by using a predetermined memory only during a period of the erasing. The memory herein is referred to as, for example, the RAM 11c. The RAM 11c is an example of a memory capable of performing writing and reading of data faster than both of the SSD 21 and the SSD 22.

Figure 11:
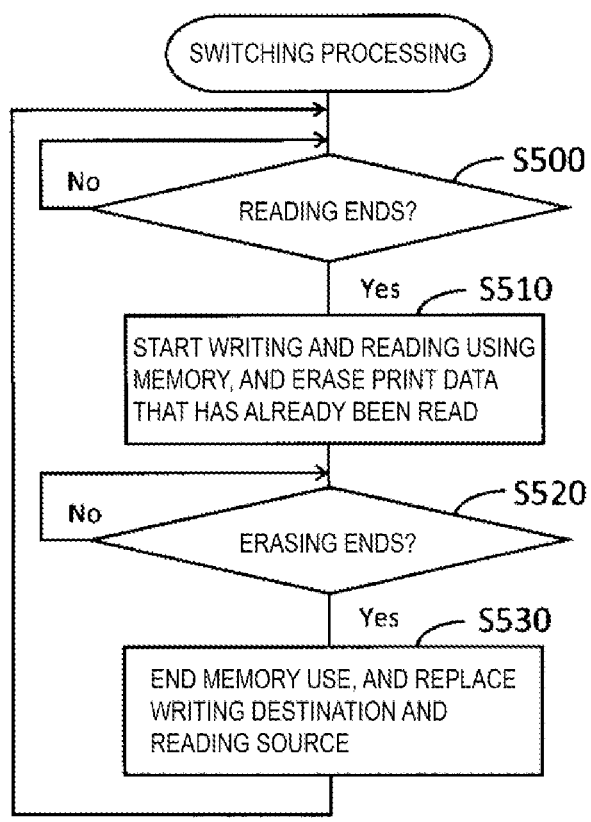
FIG. 11 is a flowchart illustrating switching processing of an SSD according to a fourth modified example.

FIG. 11 is a flowchart illustrating switching processing of an SSD according to the fourth modified example.

Figure 12:
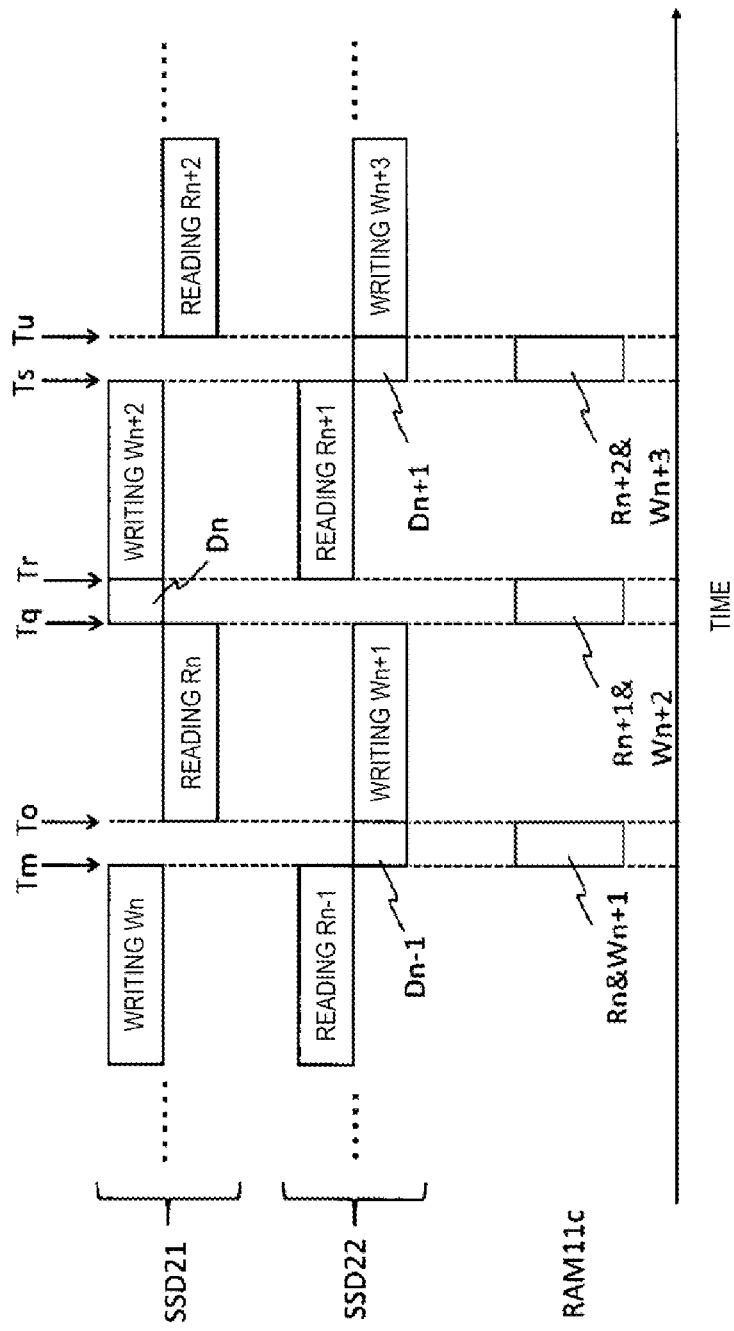
FIG. 12 is a diagram illustrating writing and reading of print data according to the fourth modified example over time.

FIG. 12 is a diagram illustrating the switching processing of an SSD according to the fourth modified example. In the fourth modified example, FIGS. 11 and 12 will be described based on the description of FIGS. 9 and 10 in the third modified example.

Step S500 is the same as step S400. In step S510 after "Yes" is determined in step S500 and the processing proceeds, the storage control unit 12b starts writing and reading of print data by using the memory. In addition, in step S510, similarly to step S410, the storage control unit 12b starts erasing of print data that is stored in an SSD having been previously a writing destination of the print data, and has been already read at a point in time when "Yes" is determined in step S500.

Step S520 is the same as step S420. In step S530 after "Yes" is determined in step S520 and the processing proceeds, the storage control unit 12b ends the writing and the reading of the print data by using the memory that have started in step S510. In addition, in step S530, the storage control unit 12b replaces the writing destination and the reading source. In other words, the SSD that has been the writing destination of the print data until "Yes" is determined in step S500 is switched to a reading source of the print data, and the SSD that has been the reading source of the print data until "Yes" is determined in step S500 is set to a writing destination of the print data. In this way, the printing control processing for a next time starts. After step S530, the storage control unit 12b performs step S500 again.

The flow of the processing in FIG. 11 will be specifically described with reference to FIG. 12. FIG. 12 is different from FIG. 10 in that periods of writing and reading of print data in relation to the RAM 11c as a memory are schematically added to FIG. 12. As described above, the period indicated by the reference sign Dn−1 from the time Tm to the time To is a period in which the storage control unit 12b erases the n−1st print data from the SSD 22. In the period from the time Tm to the time To, i.e., the period since "Yes" is determined in step S500 until "Yes" is determined in step S520, the storage control unit 12b writes, to the RAM 11c, a part of the n+1-th print data generated in the printing control processing performed for an n+1-th time from the time Tm. In addition, a part of the n-th print data written to the RAM 11c at the beginning of the printing control processing the last time, i.e., performed for an n-th time is read from the RAM 11c.

In FIG. 12, a period described as "Rn&Wn+1" in relation to the RAM 11c is a period in which a part of the n+1-th print data is written to the RAM 11c and a part of the n-th print data is read from the RAM 11c, as described above. The print data read from the RAM 11c is supplied to the printing unit 30 similarly to the print data read from the SSD.

In the fourth modified example, among the "n+1-th" print data generated and written in single printing control processing such as, for example, the printing control processing for an "n+1-th" time, the print data written to the RAM 11c is referred to as a "part of the n+1-th print data", and the print data written to the SSD is referred to as a "remainder other than the part of the n+1-th print data". The storage control unit 12b reads, from the SSD 21, a "remainder other than a part of the n-th print data" written to the SSD 21 in the period described as "reading Rn" in FIG. 12. The storage control unit 12b writes, to the SSD 22, a "remainder other than a part of the n+1-th print data" in the period described as "writing Wn+1".

Similarly, the period indicated by the reference sign Dn from the time Tq to the time Tr is a period in which the storage control unit 12b erases the n-th print data from the SSD 21. Furthermore, the storage control unit 12b writes, to the RAM 11c, a part of the n+2-th print data generated in the printing control processing performed for an n+2-th time from the time Tq in the period from the time Tq to the time period Tr, and reads, from the RAM 11c, a part of the n+1-th print data written to the RAM 11c at the beginning (time Tm to To) of the printing control processing performed for an n+1-th time. In other words, in FIG. 12, a period described as "Rn+1&Wn+2" in relation to the RAM 11c is a period in which a part of the n+2-th print data is written to the RAM 11c and a part of the n+1-th print data is read from the RAM 11c. The storage control unit 12b reads, from the SSD 22, a remainder other than a part of the n+1-th print data written to the SSD 22 in the period described as "reading Rn+1" in FIG. 12. The storage control unit 12b writes, to the SSD 21, a "remainder other than a part of the n+2-th print data in the period described as "writing Wn+2".

Hereinafter, similarly, the storage control unit 12b writes, to the RAM 11c, a part of the n+3-th print data generated in the printing control processing performed for an n+3-th time from the time Ts in the period from the time Ts to the time period Tu indicated by the reference sign Dn+1, and reads, from the RAM 11c, a part of the n+2-th print data written to the RAM 11c at the beginning (time Tq to Tr) of the printing control processing performed for an n+2-th time. In other words, in FIG. 12, a period described as "Rn+2&Wn+3" in relation to the RAM 11c is a period in which a part of the n+3-th print data is written to the RAM 11c and a part of the n+2-th print data is read from the RAM 11c. The storage control unit 12b reads, from the SSD 21, a remainder other than a part of the n+2-th print data written to the SSD 21 in the period described as "reading Rn+2" in FIG. 12. The storage control unit 12b writes a "remainder other than a part of the n+3-th print data to the SSD 22 in the period described as "writing Wn+3".

In this way, in the fourth modified example, the control unit 11 erases print data that is stored in the second storage medium and has already been read in the printing control processing performed for an n+1-th time, writes a part of the n+1-th print data to the memory simultaneously with the erasing, and writes a remainder other than the part of the n+1-th print data to the second storage medium after the end of the erasing. Furthermore, in the printing control processing performed for an n+2-th time, the control unit 11 performs processing of erasing the n-th print data stored in the first storage medium, and writing a part of the n+2-th print data to the memory simultaneously with the erasing of the n-th print data, and processing of reading a part of the n+1-th print data from the memory, and supplying the part of the n+1-th print data to the printing unit 30. Furthermore, the control unit 11 writes a remainder other than the part of the n+2-th print data to the first storage medium after the end of the erasing of the n-th print data.

According to such a configuration, when reading of print data from a certain storage medium ends, print data that is stored in the storage medium and becomes unnecessary can be erased before the print data is written to the storage medium. In addition, by performing writing and reading of print data by using the memory in an erasing period of print data from the storage medium, the writing and the reading of the print data can be continuously performed under a situation in the presence of the erasing period.

7. FIFTH MODIFIED EXAMPLE

In the description above, the implementation in which the SSD 21 and the SSD 22 are used as the storage medium is described. However, in a fifth modified example, an implementation in which the SSD 23 is used in addition to the SSD 21 and the SSD 22 will be described. In the fifth modified example, it is assumed that the SSD 21 is a first storage medium, the SSD 22 is a second storage medium, and the SSD 23 is a third storage medium.

Figure 13:
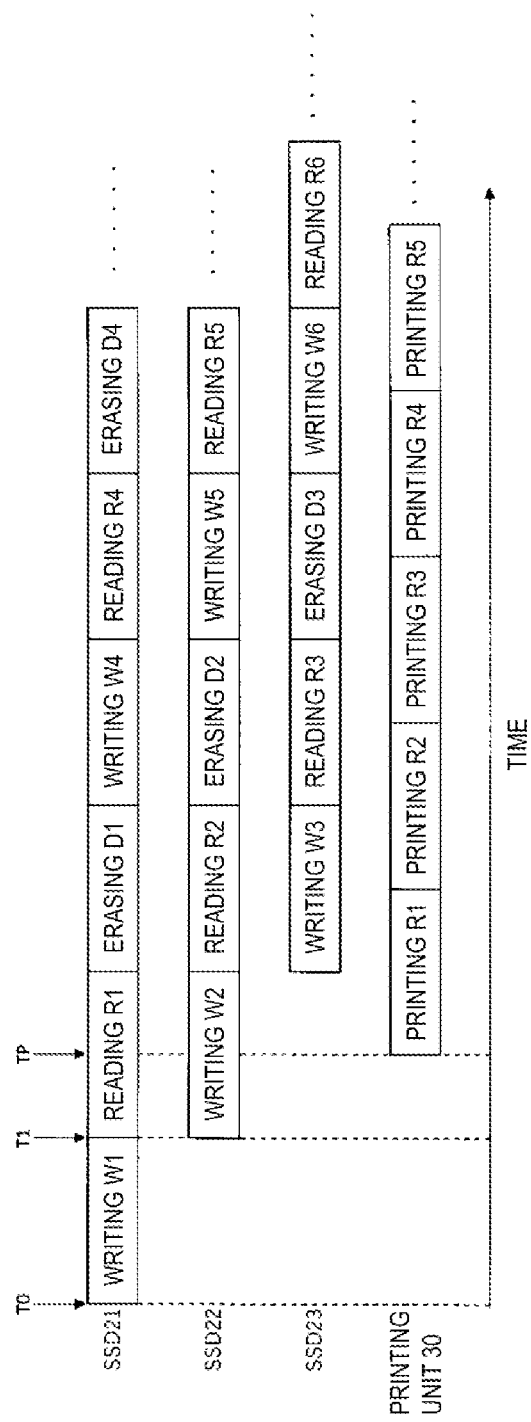
FIG. 13 is a diagram illustrating writing, reading, and printing of print data according to a fifth modified example over time.

FIG. 13 is a diagram illustrating writing, reading, and printing by the printing unit 30 of print data according to the fifth modified example over time. FIG. 13 illustrates each of periods of writing, reading, and erasing of print data in relation to each of the SSD 21, the SSD 22, and the SSD 23, and further a printing period by the printing unit 30. A way of looking at FIG. 13 is the same as that of FIG. 4, and thus description common to FIG. 4 is omitted.

In FIG. 13, a number such as, for example, "1" indicated with description of "erasing D" refers to a period in which print data written to an SSD in a period of "writing W" indicated with the same number is erased from the SSD. For example, the storage control unit 12b reads, from the SSD 21 in a period of reading R1 following the period of writing W1, print data written to the SSD 21 in the period of writing W1, and transfers the print data to the printing unit 30. Then, the storage control unit 12b erases, from the SSD 21, the print data that has been finished to be read from the SSD 21 in a period of erasing D1 following the period of reading R1.

In the fifth modified example, the switching processing of an SSD in step S140 will be described. For example, when the storage control unit 12b reads, from the SSD 21 after a time T1, print data written to the SSD 21 in the period of writing W1, the storage control unit 12b switches the SSD 22 that has been previously a writing destination of the print data to a reading source of the print data, and erases the print data from the SSD 21 that has been previously a reading source of the print data at a timing at which all pieces of the print data written to the SSD 21 are finished to be read. In addition, the storage control unit 12b sets the SSD 23 to a writing destination of the print data in conjunction with the switching. In this way, the period of reading R1 and a period of writing W2 end, and the period of erasing D1 and periods of reading R2 and writing W3 then start.

Similarly, when the storage control unit 12b reads all pieces of the print data that need to be read from the SSD 22 in the period of reading R2, the storage control unit 12b switches the SSD 23 that has been the writing destination of the print data in the same period to a reading source of the print data, and erases the print data from the SSD 22 that has been previously the reading source of the print data. In addition, the storage control unit 12b sets the SSD 21 to a writing destination of the print data in conjunction with the switching. In this way, the periods of erasing D1, reading R2, and writing W3 end, and periods of erasing D2, reading R3, and writing W4 then start. Hereinafter, similarly, the storage control unit 12b switches a state of each of the SSD 21, the SSD 22, and the SSD 23 in order of a writing destination of print data, a reading source of print data, and a erasing target of print data such that the SSD 21, the SSD 22, and the SSD 23 are each in a different state at the same time.

By such switching processing of an SSD, reading of print data from the SSD 21, reading of print data from the SSD 22, and reading of print data from the SSD 23 continue in this order without an interval until reading of the print data of a last page ends.

Note that, in the example in FIG. 13, timings at which the states of the SSD 21, the SSD 22, and the SSD 23 are switched coincide with each other, but the timings may be shifted.

For example, time needed to erase unnecessary print data that has already been read from an SSD may be less than time to write the same amount of print data to the SSD or read the same amount of print data from the SSD. Thus, when the storage control unit 12b ends erasing of print data from one SSD, the storage control unit 12b may end writing of print data to an SSD serving as a writing destination at a timing at which reading of print data from an SSD serving as a reading source has not ended, and may start writing of print data to the SSD having the print data finished to be erased. According to this configuration, a timing at which a predetermined amount of print data is finished to be written to an SSD can be set earlier than a timing at which print data is finished to be read from an SSD serving as a reading source at the same time. Thus, it is easy to avoid writing and reading of print data in relation to one SSD partially overlapping each other.

According to the fifth modified example, the control unit 11 performs printing control processing including a plurality of types of processing that can be performed simultaneously, such as generation of print data and writing of the print data to an SSD, reading of print data from a different SSD, and erasing of print data from a further different SSD. Then, in the printing control processing performed for an n-th time, n-th print data is written to the first storage medium. Then, in the printing control processing performed for an n+1-th time, n+1-th print data is written to the second storage medium, and the n-th print data is read from the first storage medium and the n-th print data is supplied to the printing unit 30. Furthermore, in the printing control processing performed for an n+2-th time, n+2-th print data is written to the third storage medium, the n+1-th print data is read from the second storage medium and the n+1-th print data is supplied to the printing unit 30, and the n-th print data stored in the first storage medium is erased. According to FIG. 13, for example, when the periods of erasing D2, reading R3, and writing W4 is considered as the printing control processing performed for an n-th time, the following periods of erasing D3, reading R4, and writing W5 can be considered as the printing control processing performed for an n+1-th time, and periods of erasing D4, reading R5, and writing W6 can be considered as the printing control processing performed for an n+2-th time.

In this way, according to the fifth modified example, the control unit 11 can smoothly perform simultaneous execution of generation of print data and printing by the printing unit 30 based on the print data while performing erasing of print data that has already been read and becomes unnecessary in the storage medium by using three storage media. Further, a frequency of rewriting data per one storage medium can be further reduced by using three storage media than a frequency when two storage media are used, and thus a product life of each storage medium such as an SSD can be extended.

8. OTHER DESCRIPTION

The present exemplary embodiment also discloses the disclosure of a category other than the printing control apparatus 40.

For example, a printing method for generating, from an image, print data to be used in printing and writing the print data to the storage unit 20, and reading the print data from the storage unit 20 and causing the printing unit 30 to perform printing onto a printing medium, based on the print data, is disclosed. Provided that n is an integer equal to or greater than one when repeating a printing control step including a plurality of types of processing configured to be performed simultaneously, the printing method includes, in the printing control step performed for an n-th time, writing, to a first storage medium included in the storage unit 20, n-th print data that is the print data generated in the printing control step performed for an n-th time, and, in the printing control step performed for an n+1-th time, writing, to a second storage medium included in the storage unit 20, n+1-th print data that is the print data generated in the printing control step performed for an n+1-th time, and also reading the n-th print data from the first storage medium and supplying the n-th print data to the printing unit 30.

Further, the present exemplary embodiment discloses the program 12 corresponding to a printing control program. A non-transitory computer-readable storage medium stores the printing control program, and the printing control program causes a computer (CPU 11a) to achieve functions of generating, from an image, print data to be used in printing and writing the print data to the storage unit 20, and reading the print data from the storage unit 20 and causing the printing unit 30 to perform printing onto a printing medium, based on the print data. Provided that n is an integer equal to or greater than one when repeating printing control processing including a plurality of types of processing configured to be performed simultaneously, the printing control program includes, in the printing control processing performed for an n-th time, writing, to a first storage medium included in the storage unit 20, n-th print data that is the print data generated in the printing control processing performed for an n-th time, and, in the printing control processing performed for an n+1-th time, writing, to a second storage medium included in the storage unit 20, n+1-th print data that is the print data generated in the printing control processing performed for an n+1-th time, and also reading the n-th print data from the first storage medium and supplying the n-th print data to the printing unit 30.

The printing head 32 may not be a line type head as illustrated in FIG. 2, and may be a so-called serial type head that is mounted on a carriage movable in parallel with the direction D2 and discharges ink onto the printing medium P during movement of the carriage. When the printing head 32 is a serial type, the transport unit 31 transports the printing medium P between a pass and a pass in which the printing head 32 discharges ink during movement of the carriage, instead of continuously transporting the printing medium P at a constant transport speed.

Further, the transport unit 31 may not transport a continuous sheet such as roll paper as a printing medium, and may transport a single-cut sheet being precut in size of a page unit.

Further, the printing head 32 may be a mechanism for performing printing by a method other than an ink-jet method, and may perform printing by an electrophotographic method or a thermal method, for example.

What is claimed is:

1. A printing control apparatus comprising:
a storage unit including a first storage medium and a second storage medium; and
a control unit configured to generate, from an image, print data to be used in printing and write the print data to the storage unit, and read the print data from the storage unit and cause a printing unit to perform printing onto a printing medium, based on the print data, wherein,
provided that n is an integer equal to or greater than one, the control unit configured to perform printing control processing including a plurality of types of processing configured to be performed simultaneously is configured to,
in the printing control processing performed for an n-th time, write, to the first storage medium, n-th print data that is the print data generated in the printing control processing performed for an n-th time, and,
in the printing control processing performed for an n+1-th time, write, to the second storage medium, n+1-th print data that is the print data generated in the printing control processing performed for an n+1-th time, and also read the n-th print data from the first storage medium and supply the n-th print data to the printing unit.

2. The printing control apparatus according to claim 1, wherein,
in the printing control processing performed for an n+2-th time, the control unit writes, to the first storage medium, n+2-th print data that is the print data generated in the printing control processing performed for an n+2-th time, and also reads the n+1-th print data from the second storage medium and supplies the n+1-th print data to the printing unit.

3. The printing control apparatus according to claim 2, wherein,
when reading of the n-th print data ends in the middle of writing of the n+1-th print data to the second storage medium in the printing control processing performed for an n+1-th time, the control unit starts reading of the n+1-th print data from the second storage medium in the printing control processing performed for an n+2-th time before writing of the n+1-th print data to the second storage medium ends, and the control unit starts writing of the n+2-th print data to the first storage medium after writing of the n+1-th print data to the second storage medium ends.

4. The printing control apparatus according to claim 2, wherein
the control unit predicts a timing at which reading of the n-th print data ends in the printing control processing performed for an n+1-th time, and ends writing of the n+1-th print data to the second storage medium before the timing of the predicted end.

5. The printing control apparatus according to claim 2 comprising
a memory configured to achieve writing and reading of data faster than both of the first storage medium and the second storage medium, wherein
the control unit is configured to,
in the printing control processing performed for an n+1-th time, erase the print data that was read and is stored in the second storage medium, write a part of the n+1-th print data to the memory simultaneously with the erasing, and write a remainder other than the part of the n+1-th print data to the second storage medium after the end of the erasing, and
in the printing control processing performed for an n+2-th time, perform processing of erasing the n-th print data stored in the first storage medium, and writing a part of the n+2-th print data to the memory simultaneously with the erasing of the n-th print data, and processing of reading the part of the n+1-th print data from the memory, and supplying the part of the n+1-th print data to the printing unit, and write a remainder other than the part of the n+2-th print data to the first storage medium after the end of the erasing of the n-th print data.

6. The printing control apparatus according to claim 1, wherein
the control unit erases the print data that was read and is stored in the second storage medium, before the n+1-th print data is written to the second storage medium in the printing control processing performed for an n+1-th time.

7. The printing control apparatus according to claim 1, wherein
the storage unit includes a third storage medium, and,
in the printing control processing performed for an n+2-th time, the control unit writes, to the third storage medium, n+2-th print data that is the print data generated in the printing control processing performed for an n+2-th time, also reads the n+1-th print data from the second storage medium and supplies the n+1-th print data to the printing unit, and erases the n-th print data stored in the first storage medium.

8. A printing method for generating, from an image, print data to be used in printing and writing the print data to a storage unit, and reading the print data from the storage unit and causing a printing unit to perform printing onto a printing medium based on the print data, the printing method comprising:
provided that n is an integer equal to or greater than one, when a printing control step is repeated that includes a plurality of types of processing configured to be performed simultaneously,
in the printing control step performed for an n-th time, writing, to a first storage medium included in the storage unit, n-th print data that is the print data generated in the printing control step performed for an n-th time; and,
in the printing control step performed for an n+1-th time, writing, to a second storage medium included in the storage unit, n+1-th print data that is the print data generated in the printing control step performed for an n+1-th time, and also reading the n-th print data from the first storage medium and supplying the n-th print data to the printing unit.

9. A non-transitory computer-readable storage medium storing a printing control program for causing a computer to achieve functions of generating, from an image, print data to be used in printing and writing the print data to a storage unit, and reading the print data from the storage unit and causing a printing unit to perform printing onto a printing medium, based on the print data, the printing control program comprising:
provided that n is an integer equal to or greater than one, when repeating printing control processing including a plurality of types of processing configured to be performed simultaneously,
in the printing control processing performed for an n-th time, writing, to a first storage medium included in the storage unit, n-th print data that is the print data generated in the printing control processing performed for an n-th time; and, in the printing control processing performed for an n+1-th time, writing, to a second storage medium included in the storage unit, n+1-th print data that is the print data generated in the printing control processing performed for an n+1-th time, and also reading the n-th print data from the first storage medium and supplying the n-th print data to the printing unit.

\* \* \* \* \*